(12) United States Patent
Togashi

(10) Patent No.: US 11,521,110 B2
(45) Date of Patent: Dec. 6, 2022

(54) LEARNING APPARATUS, LEARNING METHOD, AND NON-TRANSITORY COMPUTER READABLE STORAGE MEDIUM

(71) Applicant: YAHOO JAPAN CORPORATION, Tokyo (JP)

(72) Inventor: Riku Togashi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 1134 days.

(21) Appl. No.: 16/117,349

(22) Filed: Aug. 30, 2018

(65) Prior Publication Data

US 2019/0156248 A1 May 23, 2019

(30) Foreign Application Priority Data

Nov. 20, 2017 (JP) .............................. JP2017-223074

(51) Int. Cl.
*G06N 20/00* (2019.01)
*G06V 30/194* (2022.01)
*G06K 9/62* (2022.01)
*G06V 40/16* (2022.01)

(52) U.S. Cl.
CPC ........... *G06N 20/00* (2019.01); *G06K 9/6255* (2013.01); *G06K 9/6256* (2013.01); *G06V 30/194* (2022.01); *G06V 40/172* (2022.01)

(58) Field of Classification Search
CPC .... G06N 20/00; G06N 3/0481; G06N 3/0445; G06N 3/0454; G06N 3/0472; G06N 3/08; G06K 9/6255; G06K 9/6256; G06V 30/194; G06V 40/172

See application file for complete search history.

(56) References Cited

U.S. PATENT DOCUMENTS

| 9,430,697 B1* | 8/2016 | Iliadis .................... G06V 20/49 |
| 2009/0290800 A1* | 11/2009 | Lo ....................... G06V 10/7515 |
| | | 382/197 |
| 2015/0227819 A1* | 8/2015 | Kimura .................... G06K 9/00 |
| | | 382/159 |

(Continued)

FOREIGN PATENT DOCUMENTS

JP      2017-162074 A      9/2017

OTHER PUBLICATIONS

Apr. 18, 2018 Office Action issued in Japanese Patent Application No. 2017-223074.

*Primary Examiner* — Jitesh Patel
(74) *Attorney, Agent, or Firm* — Oliff PLC

(57) ABSTRACT

According to one aspect of an embodiment a learning apparatus includes a generating unit that generates a model. The model includes an encoder that encodes input information. The model includes a vector generating unit that generates a vector by applying a predetermined matrix to the information encoded by the encoder. The model includes a decoder that generates information corresponding to the information from the vector. The learning apparatus includes a learning unit that, when predetermined input information is input to the model, learns the model such that the model outputs output information corresponding to the input information and the predetermined matrix serves as a dictionary matrix of the input information.

13 Claims, 6 Drawing Sheets

(56) References Cited

U.S. PATENT DOCUMENTS

2016/0012314 A1* 1/2016 Ramamurthy ....... G06K 9/6255
382/160
2016/0335224 A1* 11/2016 Wohlberg ............... G06T 5/004
2021/0295166 A1* 9/2021 Rouhani ................ G06N 3/084

\* cited by examiner

FIG.3

| IMAGE ID | IMAGE DATA | ... |
|---|---|---|
| IMAGE #1 | DATA #1 | ... |
| IMAGE #2 | DATA #2 | ... |
| ... | ... | ... |

LEARNING APPARATUS, LEARNING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2017-223074 filed in Japan on Nov. 20, 2017.

BACKGROUND OF THE INVENTION

1. Field of the Invention

The present invention relates to a learning apparatus, a learning method, and a non-transitory computer readable storage medium.

2. DESCRIPTION OF THE RELATED ART

In recent years, a technology for realizing various classification processes, such as language recognition or image recognition, by using a deep neural network (DNN) including neurons that are connected in a multistage manner has been known. For example, in the technology as described above, a "weight matrix" (also referred to as "connection coefficients", in the following description, "connection coefficients" is used) between nodes included in the DNN is modified such that when predetermined input information is input to the DNN, output information that a user wants to output is to be output as output information that corresponds to the input information, to thereby cause a DNN to learn (also referred to as "training", in the following description, "learn" is used) a feature included in the input information.

Patent Literature 1: Japanese Laid-open Patent Publication No. 2017-162074

However, in the conventional technology as described above, it is sometimes difficult to check what kind of feature is learned by the DNN.

For example, in the conventional technology, when learning with a DNN is performed using a plurality of pieces of input information including a certain feature, it is expected that the DNN has learned the features, but it is difficult to check which of the features included in the input information has been learned and how much the feature has been learned. Therefore, in the conventional technology, it is difficult to ensure the predictability as to what kind of feature is to be learned by the DNN and what kind of input information is to be used to learn the feature, and consequently, it is not always possible to ensure high efficiency of learning.

SUMMARY OF THE INVENTION

It is an object of the present invention to at least partially solve the problems in the conventional technology.

According to one aspect of an embodiment a learning apparatus includes a generating unit that generates a model. The model includes an encoder that encodes input information. The model includes a vector generating unit that generates a vector by applying a predetermined matrix to the information encoded by the encoder. The model includes a decoder that generates information corresponding to the information from the vector. The learning apparatus includes a learning unit that, when predetermined input information is input to the model, learns the model such that the model outputs output information corresponding to the input information and the predetermined matrix serves as a dictionary matrix of the input information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of information registered in a learning data database according to the embodiment;

DETAILED DESCRIPTION OF THE PREFERRED EMBODIMENTS

Modes (hereinafter, referred to as "embodiments") for carrying out a learning apparatus, a learning method, and a non-transitory computer readable storage medium according to the present application will be described in detail below with reference to the drawings. The learning apparatus, the learning method, and the non-transitory computer readable storage medium according to the present application are not limited by the embodiments below. In the following embodiments, the same components are denoted by the same reference signs, and the same explanation will be omitted.

EMBODIMENT 1-1. Example of Information Providing Apparatus

Figure 1:
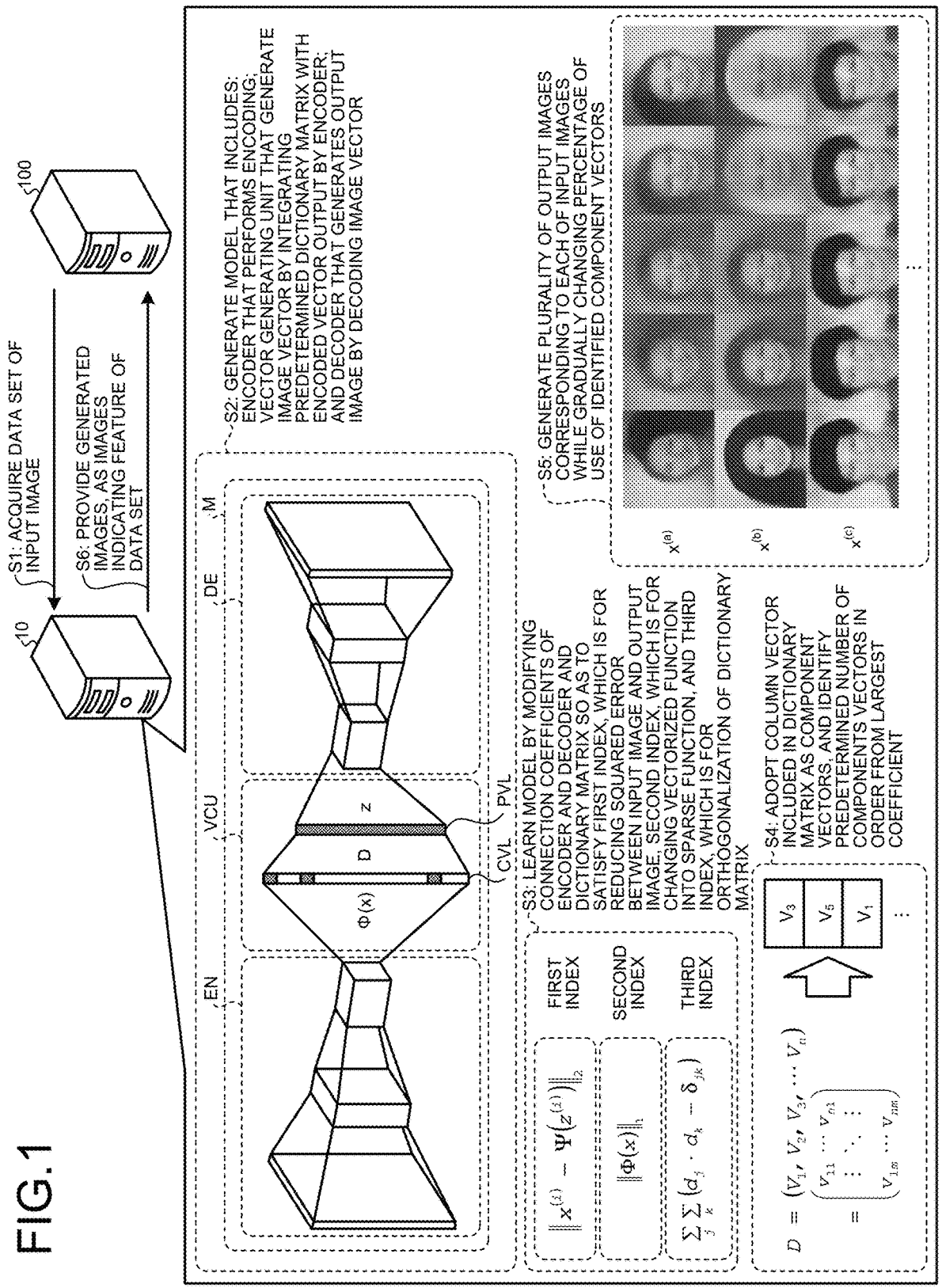
FIG. 1 is a diagram illustrating an example of a process performed by an information providing apparatus according to an embodiment.

First, examples of a learning process and a providing process performed by an information providing apparatus that is one example of a learning apparatus will be described with reference to FIG. 1. FIG. 1 is a diagram illustrating an example of a process performed by an information providing apparatus according to an embodiment. In FIG. 1, an information providing apparatus 10 is able to communicate with an information processing apparatus 100, which is used by a predetermined user, via a predetermined network N, such as the Internet, (for example, see FIG. 2).

The information providing apparatus 10 is an information processing apparatus that performs a learning process and a providing process to be described later, and is implemented by, for example, a server apparatus, a cloud system, or the like. The information processing apparatus 100 is an information processing apparatus that provides a data set including a plurality of pieces of data to the information providing apparatus 10, and is implemented by, for example, a server apparatus, a cloud system, or the like.

For example, the information processing apparatus 100 provides a data set to the information providing apparatus 10. In this case, the information providing apparatus 10 performs the learning process and the providing process using the data set, to thereby generate information indicating a feature included in each piece of data included in the data set (hereinafter, the information is described as "feature indicating information"), and provide the generated feature indicating information to the information processing apparatus 100.

1-2. Learning by DNN

The information processing apparatus 100 prepares, as a model, a neural network in which a plurality of nodes are connected in a multistage manner. The model as described above may be, for example, a DNN, an autoencoder, a long short-term memory (LSTM), a recurrent neural network, a convolutional neural network, or the like. Further, the model may be a combination of functions of the convolutional neural network and the recurrent neural network.

In this example, it is possible to cause the DNN to learn various features depending on purposes. For example, the information processing apparatus 100 is able to learn a DNN that classifies input information, by modifying a connection coefficient included in the DNN such that when certain input information is input to the DNN, information indicating a classification result (for example, a label or the like) of the input information is to be output. Further, the information processing apparatus 100 is able to learn a DNN such that when certain input information is input to the DNN, different output information, in which a feature included in the input information is converted, is to be output. For example, the information processing apparatus 100 is able to learn a DNN that converts information such that when an image in which a horse appears is input, an image in which a zebra appears in place of the horse that has appeared in the input image is to be output.

When a DNN is to be learned as described above, a plurality of pieces of information having a feature corresponding to a purpose are prepared as a data set, and the DNN is learned using the plurality of pieces of information included in the data seta. For example, when input information is to be classified, a plurality of pieces of information having a feature that is to be taken into account at the time of classification are prepared as a data set. Further, when information is to be converted, a plurality of pieces of information having a feature to be converted and a plurality of pieces of information having a converted feature are prepared.

However, even if a data set that includes a plurality of pieces of information having a predetermined feature is prepared, it is difficult to check whether the DNN has learned the predetermined feature. In other words, in the conventional learning method, a connection coefficient included in the DNN is corrected such that output information that is to be output by the DNN upon input of input information to the model approaches desired output information. However, in the learning method as described above, it is difficult to identify which of features included in the input information has been learned and how much the feature has been learned. Therefore, in the conventional technology, it is difficult to ensure the predictability as to what kind of feature is to be learned by the DNN and what kind of input information is to be used to learn the feature, and consequently, it is not always possible to ensure high efficiency of learning. In other words, in the conventional technology, it is difficult to visualize a learned feature to enable identification and prediction of the feature.

Further, when a DNN is to be learned, it is necessary to prepare, in advance, a data set of pieces of information including a feature to be learned. However, the pieces of information of the data set in this case are pieces of information for which a user has determined that the feature to be learned is included on the basis of arbitrary criteria; therefore, in some cases, the pieces of information do not have the feature to be learned.

In view of the foregoing situation, there is a demand for a technology for determining, in advance, what kind of feature is included in each piece of information included in the data set. In other words, there is a demand for a technology for identifying a type of feature that is commonly included in all pieces of information included in the data set, without using user's arbitrary criteria.

1-3. Learning Process

To cope with the situation as described above, the information providing apparatus 10 performs a learning process as described below. First, the information providing apparatus 10 generates a model that includes an encoder that encodes input information, a vector generating unit that generates a vector by applying a predetermined matrix to the encoded information, and a decoder that generates information corresponding to the information from the vector. Then, the information providing apparatus 10 learns the model such that when predetermined input information is input to the model, the model outputs output information corresponding to the input information and the predetermined matrix serves as a dictionary matrix of the input information.

In this example, the information providing apparatus 10 learns the model such that the output information approaches the input information. Further, the information providing apparatus 10 learns the encoder such that the input information is encoded to a sparse vector. Furthermore, the information providing apparatus 10 learns the model such that vectors included in the predetermined matrix become orthogonal to each other. More specifically, the information providing apparatus 10 generates a model including a vector generating unit that integrates a predetermined matrix with encoded information, and learns the model such that column vectors included in the predetermined matrix become orthogonal to each other.

If the model is learned such that output information to be output by the model has desired contents and the contents correspond to contents of the input information, the entire model is learned such that output information corresponding to a feature of the input information is to be output. More specifically, the encoder and the vector generating unit of the model are learned so as to generate, from the input information, a feature vector indicating a feature that is necessary to obtain desired output information among features included in the input information. Further, the decoder is learned so as to output, from the feature vector, output information corresponding to the feature indicated by the feature vector.

In this example, the information providing apparatus 10 learns the vector generating unit such that the feature vector indicating a feature included in the input information corresponds to a product of the input information encoded by the encoder (hereinafter, described as an "coded vector") and the dictionary matrix. In other words, the information providing apparatus 10 learns the model such that the feature vector corresponds to a product of the dictionary matrix, which is an aggregation of vectors each indicating a component of the feature (i.e., a base vector of the feature), and the coded vector, which indicates which of the vectors included in the dictionary matrix is to be used and how much the vector is to be used (i.e., a recipe of the feature included in the input information). Here, the components of the feature indicate individual features that constitute an overall feature of the input information.

When the learning as described above is performed, the information providing apparatus 10 is able to obtain the dictionary matrix, which is an aggregation of base vectors of the feature included in the pieces of information that are included in the data set used for the learning. The dictionary matrix as described above includes, as vectors, components of the feature of the data set that has been learned by the model without using user's arbitrary criteria. Consequently, the information providing apparatus 10 is able to obtain the dictionary matrix that indicates what feature is to be learned by the model.

In this example, the model that has been learned through the learning as described above represents the feature vector included in the input information, by a product of the base vectors included in the dictionary matrix and the coded vector. However, even when the accuracy of the base vectors included in the dictionary matrix is low, in some cases, the model as described above may reproduce a feature of the input information to the extent that the decoder can output appropriate output information, by complicating the coded vector.

Therefore, the information providing apparatus 10 learns the model such that the output information approaches desired output information and such that elements with a value of "0" among elements included in the coded vector are increased. In other words, the information providing apparatus 10 learns the model such that the accuracy of the entire model is not reduced and the coded vector becomes a sparse vector. When the process as described above is performed, the model generates a feature vector by obtaining a product of the dictionary matrix, which appropriately indicates components of a feature, and a simple abstract vector. As a result, the information providing apparatus 10 is able to bring the base vectors included in the dictionary matrix closer to the components of the feature included in the pieces of information of the data set that is used for the learning, so that it is possible to improve the accuracy of the dictionary matrix.

In this example, the dictionary matrix includes a plurality of base vectors each indicating a component of the feature included in the pieces of information included in the data set. However, the plurality of base vectors may indicate the same component depending on learning. In this example, when the dictionary matrix is provided as information indicating the feature learned by the model, it is desirable that the base vectors included in the dictionary matrix represent different components. Therefore, the information providing apparatus 10 learns the model such that the vectors included in the dictionary matrix become orthogonal to each other. As a result of the process as described above, the information providing apparatus 10 is able to learn the dictionary matrix that includes vectors indicating different components.

1-4. Providing Process

The information providing apparatus 10 may provide a user with information as to what kind of feature has been learned by the model, by providing the dictionary matrix as it is to the user. For example, the information providing apparatus 10 is able to indicate how the model has learned the feature along with the progress of learning, by sequentially adopting the pieces of information included in the data set as input information and providing the user with the dictionary matrix every time a feature of the input information is learned.

In contrast, because the dictionary matrix represents the feature included in the data set by vectors, in some cases, it may be difficult to easily indicate what kind of feature has been learned. Therefore, the information providing apparatus 10 performs a providing process as described below. For example, the information providing apparatus 10 encodes predetermined input information by using the encoder for which learning has been performed, and acquires a plurality of pieces of output information corresponding to the predetermined information by using the vector generating unit and the decoder for which the learning has been performed, while changing an encoding result. Then, the information providing apparatus 10 provides the plurality of pieces of acquired output information.

For example, when learning is performed through the learning process as described above, the model converts the input information to a coded vector that indicates which of the vectors included in the dictionary matrix is to be used and how much the vector is to be used, generates a feature vector that is a product of the coded vector and the dictionary matrix, and generates output information from the generated feature vector. In this example, an element other than the element with a value of "0" among the elements included in the coded vector indicates a percentage of use of a corresponding one of the vectors included in the dictionary matrix, i.e., a percentage of use of a component of the feature.

When the plurality of pieces of output information are generated while gradually changing the percentage of use of the component of the feature as described above, the model generates a plurality of pieces of output information in which the percentage of the subject component (i.e., a certain feature among a plurality of features included in the overall feature) has been changed. For example, when the output information is an image of a face of a person, and a component to be changed is a "face orientation of the person", the model outputs a plurality of pieces of output information in which the face orientation of the person has gradually been changed. As a result, the information providing apparatus 10 is able to provide information that indicates a type of a component indicated by the vector included in the dictionary matrix, that is, a type of a component of the feature included in the data set.

It is assumed that the dictionary matrix includes not only a vector of a component that largely contributes to representation of the feature of each piece of information included in the data set, but also a vector of a component that does not much contribute to the representation. Therefore, the information providing apparatus 10 provides a plurality of pieces of output information in which the percentage of the component that largely contributes to the representation of the feature of each piece of information included in the data set has gradually been changed.

For example, the information providing apparatus 10 identifies a predetermined number of vectors in order from the largest coefficient among the vectors included in the dictionary matrix. For example, the information providing apparatus 10 selects a predetermined number of vectors in order from the largest value of norms of the vectors. Then, the information providing apparatus 10 outputs a plurality of pieces of output information corresponding to the input information, while changing a value of any of elements corresponding to the identified vectors among the elements included in the coded vector that is obtained by encoding the input information.

For example, when the coefficient of a vector $V_1$ included in the dictionary matrix is the largest, the information providing apparatus 10 identifies an element to be integrated with the vector $V_1$ among the elements included in the coded vector. Then, the information providing apparatus 10 generates a plurality of feature vectors while gradually changing the value of the identified element, and generates output information for each of the generated feature vectors. As a result, the information providing apparatus 10 is able to provide information with which a type of the component of the feature included in the data set can easily be understood.

1-5. Example of Process

An example of the generation process and the providing process performed by the information providing apparatus 10 will be described below with reference to FIG. 1. In the following description, explanation is given of an example of a process of generating, as a model, a certain model that includes an encoder that encodes an image that has been input (hereinafter, described as an "input image"), a vector generating unit that generates an image vector by applying a predetermined matrix to the encoded input image, and a decoder that generates an image (hereinafter, described as an "output image") corresponding to the input image from the image vector. Further, in the following description, an example will be described in which a certain model is generated, as a model, that includes a decoder that generates, from an image vector, an output image by reproducing an input image that has been input to the encoder.

For example, the information providing apparatus 10 acquires an input-image data set that includes a plurality of input images, from the information processing apparatus 100 (Step S1). In this case, the information providing apparatus 10 generates information indicating a feature of each of the input images included in the acquired data set, by performing the generation process and the providing process as described below.

First, the information providing apparatus 10 generates a model M that includes an encoder EN that encodes an input image, a vector generating unit VCU that generates an image vector by integrating a coded vector output by the encoder EN with a predetermined dictionary matrix, and a decoder DE that generates an output image by decoding the image vector (Step S2). For example, the information providing apparatus 10 generates the encoder EN that encodes a feature included in the input image, by gradually reducing the number of dimensions of the input image that has been input. The encoder EN as described above may be implemented by, for example, a convolutional neural network.

Further, the information providing apparatus 10 generates the vector generating unit VCU that includes a coded vector layer CVL, which receives a coded vector output by the encoder EN, and an image vector layer PVL, which generates an image vector (i.e., a feature vector of the input image) by applying the dictionary matrix to the output of the coded vector layer. Furthermore, the information providing apparatus 10 generates the decoder DE that generates an output image corresponding to the input image from the image vector output by the vector generating unit VCU. For example, the information providing apparatus 10 may generate the model M by inserting the vector generating unit VCU in a certain stage that is next to an intermediate layer for which the number of dimensions of a vector to be output is the smallest in an autoencoder configured by the convolutional neural network.

When the model M as described above is generated, the coded vector, the dictionary matrix, and the image vector are represented by Equations below. For example, if the input image is denoted by x and an encoding function for encoding by the encoder EN is denoted by $\Phi$, an n-dimensional coded vector $\Phi(x)$ output by the encoder EN is represented by Equation (1) below.

$$\phi(x)=(s_1,s_2,s_3,\ldots s_n) \qquad (1)$$

Further, when the dictionary matrix is denoted by D, an image vector z output by the vector generating unit VCU is represented by Equation (2) below.

$$z=D\phi(x) \qquad (2)$$

Here, when the dictionary matrix D is represented by a plurality of column vectors $V_1$ to $V_n$ as in Equation (3) below, the image vector z that is a feature vector of the input image is represented by Equation (4) below.

$$D=(V_1,V_2,V_3,\ldots V_n) \qquad (3)$$

$$z=s_1V_1+s_2V_2+\ldots s_nV_n \qquad (4)$$

As indicated by Equation (4), in the model M1, the abstract vector $\Phi(x)$ can be regarded as a parameter that indicates a percentage of use of each of the column vectors $V_1$ to $V_n$ included in the dictionary matrix, and the dictionary matrix D can be regarded as a set of the column vectors $V_1$ to $V_n$ that indicate components of the feature of each of the input images included in the data set.

Then, the information providing apparatus 10 performs dictionary learning of the model M1 using the acquired data set. More specifically, the information providing apparatus 10 learns the model by modifying connection coefficients of the encoder and the decoder and the dictionary matrix so as to satisfy a first index, which is for reducing a squared error between the input image and the output image, a second index, which is for changing a vectorized function into a sparse function, and a third index, which is for orthogonalization of the dictionary matrix (Step S3).

For example, if it is assumed that an i-th input image is denoted by $x^{(i)}$, an image vector of $x^{(i)}$ is denoted by $z^{(i)}$, and an output image generated by the decoder DE from $z^{(i)}$ is denoted by $\Psi(z^{(i)})$, the squared error between the input image and the output image is represented by Equation (5) below. In this case, if the model M is learned such that the input image and the output image approach each other, the model M1 performs encoding or the like so as to maintain the overall feature of the input image. Therefore, the information providing apparatus 10 sets the first index for reducing the squared error between the input image and the output image as represented by Equation (5).

$$\|x^{(i)}-\Psi(z^{(i)})\|_2 \qquad (5)$$

Further, an L1-norm of the coded vector $\Phi(x)$ output by the encoder EN is represented by Equation (6) below. The information providing apparatus 10 sets the second index for reducing a value of the L1 norm represented by Equation (6) in order to convert the coded vector $\Phi(x)$ to a sparse vector. In other words, the information providing apparatus 10 sets, as the second index, L1 normalization of the coded vector $\Phi(x)$.

$$\|\Phi(x)\|_1 \qquad (6)$$

Furthermore, the information providing apparatus 10 sets, as the third index, orthogonalization of the column vectors included in the dictionary matrix D. For example, when two elements included in the dictionary matrix D are denoted by $d_j$ and $d_k$, orthogonalization of the column vectors included in the dictionary matrix D is implemented by minimizing Equation (7) by using the Kronecker delta $\delta_{jk}$.

$$\sum_j \sum_k (d_j \cdot d_k - \delta_{jk}) \qquad (7)$$

To satisfy the first to the third indices as described above, for example, the information providing apparatus 10 calculates a sum of Equation (5) to Equation (7) as indicated by Equation (8), and learns the model M such that the calculated sum is minimized. More specifically, the information providing apparatus 10 modifies connection coefficients included in the encoder EN and the decoder DE and the dictionary matrix D such that Equation (8) is minimized. In Equation (8), $\lambda$ indicates a predetermined coefficient and can be set arbitrarily. The information providing apparatus 10 may add a term to Equation (8) by taking into account classification of the input image, for example. Further, in Equation (8), the output image $\Psi(z^{(i)})$ is denoted by $y^{(i)}_{img}$.

$$\min_{\Phi,\Psi,D} \sum_i \|x^{(i)} - y^{(i)}_{img}\|_2 + \lambda_1 \sum_i \|\Phi(x)^{(i)}\|_1 + \lambda_2 \sum_j \sum_k (d_j \cdot d_k - \delta_{jk}) \qquad (8)$$

When learning as described above using each of the input images included in the data set is terminated, the information providing apparatus 10 performs the providing process as described below by using the learned model M. First, the information providing apparatus 10 adopts the column vectors included in the dictionary matrix as component vectors and identify a predetermined number of component vectors in order from the largest coefficient (Step S4). For example, the information providing apparatus 10 identifies the column vectors $V_3$, $V_5$, and $V_1$ in order from the largest coefficient.

Then, the information providing apparatus 10 generates a plurality of output images corresponding to each of input images while gradually changing a percentage of use of the identified component vectors (Step S5). For example, the information providing apparatus 10 identifies an input image $x^{(a)}$ that uses the column vector $V_3$. More specifically, the information providing apparatus 10 extracts, from the data set, the input image $x^{(a)}$ for which a value of an element $s_3$ that is to be integrated with the column vector $V_3$ among the elements $s_1$ to $s_n$ included in the coded vector $\Phi(x)$ is the largest. Then, the information providing apparatus 10 generates a plurality of image vectors z by gradually changing the value of the element $s_3$ in the coded vector $\Phi(x^{(a)})$ of the input image $x^{(a)}$, and generates an output image for each of the image vectors z.

Similarly, the information providing apparatus 10 extracts, from the data set, an input image $x^{(b)}$ for which a value of the element $s_5$ that is to be integrated with the column vector $V_5$ among the elements $s_1$ to $s_n$ included in the coded vector $\Phi(x)$ is the largest. Then, the information providing apparatus 10 generates a plurality of image vectors z by gradually changing the value of the element $S_5$ in the coded vector $\Phi(x^{(b)})$ of the input image $x^{(b)}$, and generates an output image for each of the image vectors z.

Furthermore, the information providing apparatus 10 extracts, from the data set, the input image $x^{(c)}$ for which a value of the element $s_1$ that is to be integrated with the column vector $V_1$ among the elements $s_1$ to $s_n$ included in the coded vector $\Phi(x)$ is the largest. Then, the information providing apparatus 10 generates a plurality of image vectors z by gradually changing the value of the element $s_1$ in the coded vector $\Phi(x^{(c)})$ of the input image $x^{(c)}$, and generates an output image for each of the image vectors z.

Subsequently, the information providing apparatus 10 provides the generated images, as the images indicating a feature of the data set, to the information processing apparatus 100 (Step S6). Through the process as described above, for example, the information providing apparatus 10 is able to provide images in which any of components of the feature included in the input image is gradually changed.

For example, in the example illustrated in FIG. 1, it is assumed that the information providing apparatus 10 provides a plurality of output images in which a face orientation of a person captured in the input image $x^{(a)}$ is gradually changed. As a result, a user is able to recognize that the model M1 has learned, as the column vector $V_3$, a certain component, such as the "face orientation", of the feature included in the input image. In other words, the user is able to find that the input images included in the data set have the component of the "face orientation".

Further, in the example illustrated in FIG. 1, it is assumed that the information providing apparatus 10 provides a plurality of output images in which a color of hair of a person captured in the input image $x^{(b)}$ is gradually changed. As a result, the user is able to recognize that the model M1 has learned, as the column vector $V_5$, a certain component, such as the "color of hair", of the feature included in the input image. In other words, the user is able to find that the input images included in the data set have the component of the "color of hair".

Furthermore, in the example illustrated in FIG. 1, it is assumed that the information providing apparatus 10 provides a plurality of output images in which gender of a person captured in the input image $x^{(c)}$ is gradually changed. As a result, the user is able to recognize that the model M1 has learned, as the column vector $V_1$, a certain component, such as the "gender", of the feature included in the input image. In other words, the user is able to find that the input images included in the data set have the component of the "gender".

The components, such as the "face orientation", the "color of hair", and the "gender", of the feature are described by way of example, and a type of the component that is recognized by the user from the output images is not limited to this example. In other words, the information providing apparatus 10 identifies a component of the feature included in the data set and provides information indicating the identified component to the user, without the need of user's operation of arbitrarily identifying the component of the feature included in the data set. Therefore, the information providing apparatus 10 is able to provide information that objectively indicates the component of the feature included in the data set.

1-6. Mode of Application

In the example as described above, the first index is set such that an input image that has been input and an output image that is to be output become similar to each other. However, the embodiment is not limited to this example. For example, the information providing apparatus 10 may learn the decoder DE included in the model M so as to output information (i.e., a label) indicating a class to which the input image belongs. Further, the information providing apparatus 10 may learn the decoder DE so as to output an output image in which a feature of a predetermined object in the input image has been changed.

Furthermore, the information providing apparatus 10 may generate and learn the model M1 such that when an arbitrary content, such as a still image, a moving image, voice, or text, is adopted as input information, output information that is generated based on a feature included in the input information is to be output in a desired mode. Moreover, the information providing apparatus 10 may generate and learn the model M1 such that the input information and the output information have different types of contents.

Furthermore, the information providing apparatus 10 may generate and provide providing information that indicates a component of a feature learned by the model, in a mode corresponding to the type of the content. For example, when music audio data is adopted as input information, the information providing apparatus 10 performs the learning process as described above, and learns the dictionary matrix that indicates components of a feature of each music included in the data set (for example, mood of jazz, use of violin, woman's voice, or the like). Then, the information providing apparatus 10 may generate, from audio data of certain music, a plurality of pieces of audio data in which an element of the abstract vector is gradually changed, in order to generate, for example, a plurality of pieces of audio data in which woman's voice is gradually changed to man's voice or in which audio data with mood of jazz is changed to audio data with mood of electro dance music, and provide the generated audio data as the providing information.

By providing the providing information as described above, for example, the information providing apparatus 10 is able to indicate not only a type of a component of a feature of information included in the data set, but also a type of a feature with a meaning opposite to the meaning of a certain feature. For example, the information providing apparatus 10 is able to provide a user with information indicating that a feature with a meaning opposite to a feature with a meaning of "man's voice" is "woman's voice" in a certain data set.

Further, the information providing apparatus 10 may adopt, as the encoder EN and the decoder DE, a convolutional neural network (CNN), a recurrent neural network (RNN), an LSTM, or the like. In other words, as long as a neural network includes a plurality of nodes that are connected in a multistage manner and that output new values corresponding to an input value using a predetermined activation function, such as a sigmoid function, and as long as the neural network has a predetermined connection coefficient with respect to a value to be transmitted between the nodes, the information providing apparatus 10 may prepare a neural network with arbitrary functions and configurations among networks as described above, set the vector generating unit VCU in a certain stage that is next to a layer that outputs intermediate output (for example, a coded vector or the like) indicating a feature of input information, and perform what is called dictionary learning. By performing the process as described above, the information providing apparatus 10 is able to identify a type of the feature learned by the model.

The model as described above may be a data set indicating a connection relation or a connection coefficient between nodes included in the neural network, or may be software (for example, a program module) that causes a computer to operate as the model using the data set as described above.

For example, the model may be a model that includes the encoder EN that encodes input information, the vector generating unit VCU that generates a vector by applying a predetermined matrix to the input information encoded by the encoder EN, and the decoder that generates output information corresponding to the input information from the vector generated by the vector generating unit VCU, where the model is configured to output output information corresponding to predetermined input information upon input of the predetermined input information and learned such that a predetermined matrix serves as a dictionary matrix of the input information. The model as described above serves as a model that, when predetermined input information is input to the model, causes a computer to perform a process of outputting, from the model, a plurality of pieces of output information corresponding to the predetermined input information while gradually changing the encoded input information.

The model includes a first element, which belongs to a certain layer that is provided between the input layer and the output layer and that is other than the output layer, and a second element, for which a value is calculated based on the first element and a weight of the first element, and causes a computer to perform calculations with respect to information input to the input layer on the basis of the first element and the weight of the first element by adopting each of elements belonging to each of the layers other than the output layer as the first element, and output, from the output layer, information corresponding to the information input to the input layer. The model may be a certain model that is expected to be used as a program module as a part of artificial intelligence software.

For example, when the model is implemented by a neural network, such as a DNN, that includes one or more intermediate layers, the first element included in each of the models can be regarded as any of nodes included in the input layer or the intermediate layer, the second element corresponds to a node to which a value is transmitted from the node corresponding to the first element, i.e., a node in a next stage, and the weight of the first element is a weight that is taken into account with respect to the value that is transmitted from the node corresponding to the first element to the node corresponding to the second element, i.e., a connection coefficient.

For example, when input information, such as an input image, is input to the input layer, the model causes a computer to output, from the output layer, output information corresponding to the input information. For example, the model is used by a computer that includes a central processing unit (CPU) and a memory. Specifically, the CPU of the computer operates so as to read the model stored in the memory, perform calculations with respect to the input information input to the input layer of the model on the basis of a weight matrix (connection coefficient), an activation function, or the like, which is adopted in the neural network that has been learned through the learning process as described above, in accordance with a command that is based on the read model, and output, from the output layer, output information that has been input. In this example, the model may cause the computer to generate a plurality of pieces of output information corresponding to a single piece of input information, by gradually changing a value of an element, for which a value is not set to "0", in the coded vector that is the input information encoded by the encoder EN.

Further, the information providing apparatus 10 may provide a service using the model that has been learned through the learning process as described above. For example, the model M that has been learned through the learning as described above outputs output information corresponding to a feature for which any of components of the feature included in the input information has been changed by changing a value of the abstract vector. Therefore, for example, the information providing apparatus 10 may input user information, such as an attribute (a demographic attribute, a psychographic attribute, or the like) on a certain user in the model M, and generate a plurality of pieces of output information by changing an element corresponding to any of components in a stepwise manner in the abstract vector generated by the model Ml, to thereby generate output information for a different user who is similar to the certain user, in addition to the output information for the certain user. The output information as described above may be information to be provided to the user or information indicating preference of each user or a type of a product, a service, or an advertisement that attracts the user.

1-7. Learning

The information providing apparatus 10 does not necessarily have to orthogonalize the column vectors included in the dictionary matrix. Even when a common component is included in the column vectors included in the dictionary matrix, the information providing apparatus 10 is able to provide a user with information indicating how the model has learned the component of the information included in the input information of the data set, by performing the providing process as described above. Further, the coefficient λ in Equation (8) may be set to an arbitrary value depending on how the learning is to be progressed.

Furthermore, the information providing apparatus 10 may learn the model M by using generative adversarial networks (GANs). In this case, the model M may be a model that constitutes a part of the GANs.

Moreover, the information providing apparatus 10 may perform pre-training on the encoder EN and the decoder DE. For example, the information providing apparatus 10 may perform encoding by reducing the number of dimensions of an input image, and thereafter generate an autoencoder that reproduces an output image that is similar to the original input image from the encoded information, and perform pre-training on the generated autoencoder. Then, the information providing apparatus 10 may generate the model M, in which the vector generating unit VCU is inserted in a certain stage that is next to an intermediate layer for which the number of dimensions of a vector to be output is the smallest in the autoencoder, and learn the model M through the learning process as described above.

2. Configuration of Information Providing Apparatus

Figure 2:
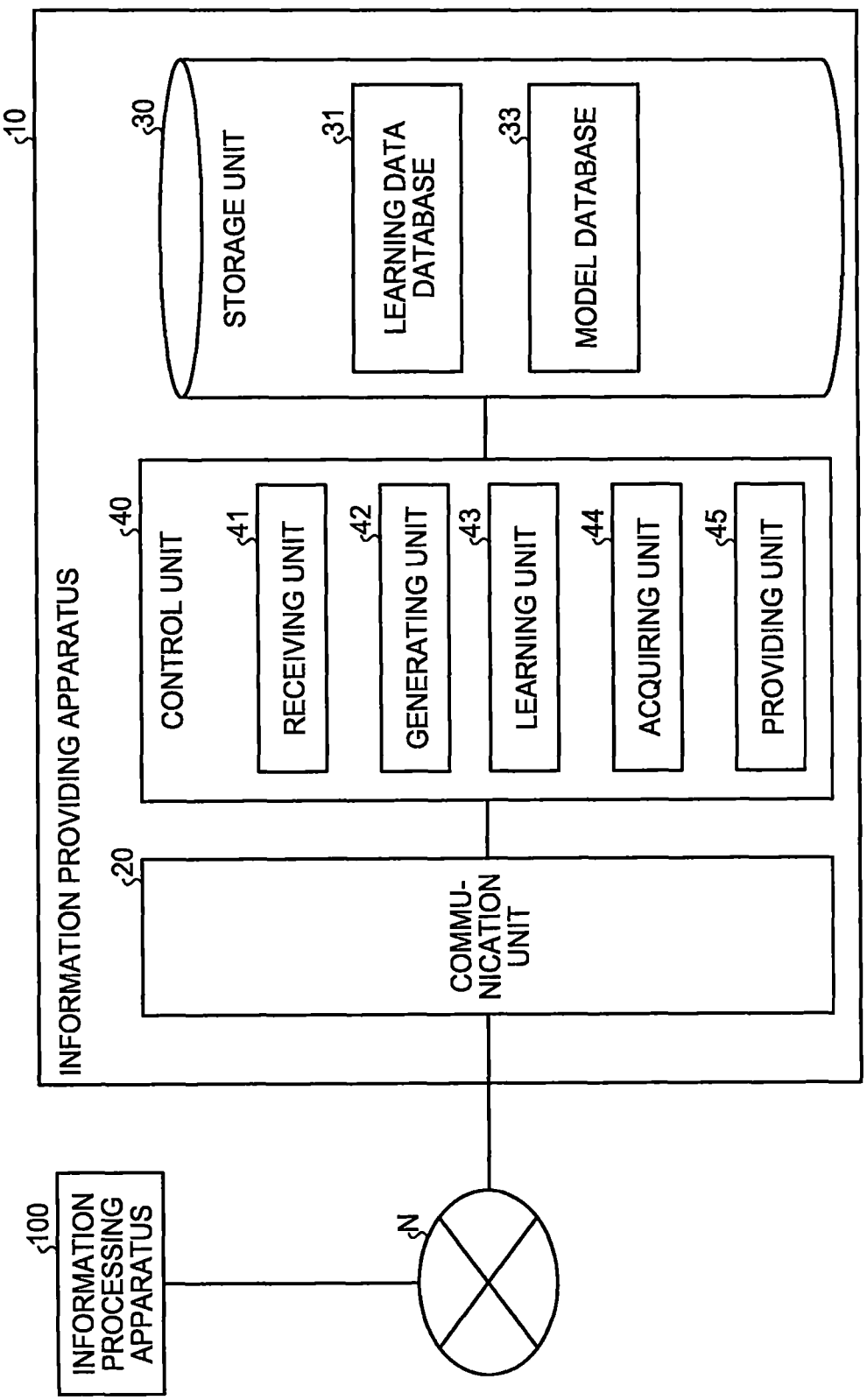
FIG. 2 is a diagram illustrating a configuration example of the information providing apparatus according to the embodiment.

An example of a functional configuration of the information providing apparatus 10 that implements the learning process as described above will be described below. FIG. 2 is a diagram illustrating a configuration example of the information providing apparatus according to the embodiment. As illustrated in FIG. 2, the information providing apparatus 10 includes a communication unit 20, a storage unit 30, and a control unit 40.

The communication unit 20 is implemented by, for example, a network interface card (NIC) or the like. The communication unit 20 is connected to a network N in a wired or wireless manner, and transmits and receives information to and from the information processing apparatus 100.

The storage unit 30 is implemented by, for example, a semiconductor memory device, such as a random access memory (RAM) or a flash memory, or a storage device, such as a hard disk or an optical disk. Further, the storage unit 30 stores therein a learning data database 31 and a model database 32.

In the learning data database 31, learning data, that is, the data set acquired from the information processing apparatus 100, is registered. For example, FIG. 3 is a diagram illustrating an example of information registered in the learning data database according to the embodiment. As illustrated in FIG. 3, information having items, such as an "image identifier (ID)" and "image data", is registered in the learning data database 31.

In this example, the "image ID" is an identifier indicating image data. The "image data" is data related to an image included in the learning data. For example, in the example illustrated in FIG. 3, an image data ID of "image #1" and image data of "data #1" are registered in an associated manner. The information as described above indicates that image data identified by the image ID of "image #1" is the image data of "data #1". In the example illustrated in FIG. 3, a conceptual value such as "data #1" is described; however, in reality, information input to the model, that is, data of an image serving as an input image, is registered. In addition, it is possible to register arbitrary information other than the information illustrated in FIG. 3 in the learning data database 31.

Referring back to FIG. 2, the explanation will be continued. In the model database 32, data of the model M that serves as a learning target is registered. For example, connection relations or connection coefficients of nodes included in the model M are registered in the model database 32.

The control unit 40 is a controller, and is implemented by, for example, causing a processor, such as a CPU or a micro processing unit (MPU), to execute various programs stored in an internal storage device of the information providing apparatus 10 by using a random access memory (RAM) or the like as a work area. Further, the control unit 40 is a controller, and may be implemented by, for example, an integrated circuit, such as an application specific integrated circuit (ASIC) or a field programmable gate array (FPGA).

Furthermore, through information processing according to the model M stored in the storage unit 30, the control unit 40 performs a process of outputting a plurality of pieces of output information corresponding to input information. For example, when predetermined input information is input to the model, the control unit 40 performs a process of outputting, from the model, a plurality of pieces of output information corresponding to the predetermined input information while gradually changing the encoded input information.

As illustrated in FIG. 2, the control unit 40 includes a receiving unit 41, a generating unit 42, a learning unit 43, an acquiring unit 44, and a providing unit 45. The receiving unit 41 receives a data set from the information processing apparatus 100. In this case, the receiving unit 41 registers the received data set, as learning data, in the learning data database 31.

The generating unit 42 generates the model M that includes the encoder EN that encodes input information, the vector generating unit VCU that generates a vector by applying a predetermined matrix to the encoded information, and the decoder DE that generates information corresponding to information input from the vector. More specifically, the generating unit 42 generates the model M including the vector generating unit VCU that integrates the predetermined matrix with the encoded input information.

For example, the generating unit 42 generates the model M that includes the encoder EN that encodes an input image, the vector generating unit VCU that generates an image vector by applying a dictionary matrix to the encoded image, and the decoder DE that generates an output image corresponding to the input image from the image vector. Further, for example, the generating unit 42 generates, as the model M, a model M including the decoder DE that reproduces, from the image vector, the image input to the encoder EN. Moreover, for example, the generating unit 42 generates, as the model M, a model that includes a convolutional neural network as the encoder EN.

The learning unit 43 learns the model M such that when predetermined input information is input to the model M generated by the generating unit 42, the model M outputs output information corresponding to the input information and the predetermined matrix serves as a dictionary matrix of the input information. For example, the learning unit 43 acquires the model M generated by the generating unit 42. Then, the learning unit 43 adopts each of images registered in the learning data database 31 as an input image, and modifies connection coefficients of the encoder EN and the decoder DE included in the model M and a value of each of elements included in the dictionary matrix so as to satisfy Equation (8) described above.

For example, the learning unit 43 learns the model M such that when predetermined input information is input to the model M, output information output from the model M approaches the input information. Further, the learning unit 43 learns the model M so as to encode the input information to a sparse vector. Furthermore, the learning unit 43 learns the model M such that the vectors included in the predetermined matrix become orthogonal to each other. More specifically, the learning unit 43 learns the model M such that the column vectors included in the predetermined matrix become orthogonal to each other.

Through the process as described above, the learning unit 43 is able to learn the model M that includes a dictionary matrix that indicates components of a feature of pieces of information included in the data set, the encoder EN that encodes input information to a coded vector indicating which of the components included in the dictionary matrix is to be used and how much the component is to be used to reproduce the feature, and the decoder DE that outputs output information close to the input information from a product of the coded vector and the dictionary matrix. Then, the learning unit 43 registers the learned model M in the model database 32.

The acquiring unit 44 encodes predetermined information using the encoder EN, which has been learned by the learning unit 43, and acquires a plurality of pieces of output information corresponding to the predetermined input information using the vector generating unit VCU and the decoder DE, which have been learned by the learning unit 43, while changing an encoding result. For example, the acquiring unit 44 identifies a predetermined number of vectors in order from the largest coefficient among vectors included in the dictionary matrix, and acquires a plurality of pieces of output information corresponding to the input information while changing a value of any of elements corresponding to the identified vector among the elements included in the coded vector.

For example, the acquiring unit 44 reads the dictionary matrix from the model database 32, and identifies, as change target vectors, a predetermined number of vectors in order from the largest coefficient among the column vectors included in the dictionary matrix (i.e., component vectors indicating components). Subsequently, the acquiring unit 44 reads the model M from the model database 32, and converts each of images registered in the learning data database 31 to a coded vector by using the encoder EN of the read model M.

Subsequently, the acquiring unit 44 performs a process as described below for each of the change target vectors. First, the acquiring unit 44 identifies a coded vector for which a value of an element corresponding to the change target vector is other than "0" and for which the absolute value is the largest. Then, the acquiring unit 44 generates a plurality of pieces of output information by using the model M while changing a value of an element that corresponds to the change target vector in the identified coded vector. In other words, the acquiring unit 44 generates a plurality of coded vectors, for which the value of the element corresponding to the change target vector has been changed, from the identified coded vector, and calculates a product of each of the generated coded vectors and the dictionary matrix to thereby generate a plurality of image vectors. Then, the acquiring unit 44 inputs each of the image vectors being still vectors in the decoder DE, and acquires a plurality of output images in which the component is gradually changed.

Further, the acquiring unit 44 performs the process as described above for each of the change target vectors, to thereby acquire a plurality of output image groups in which the components are gradually changed. Thereafter, the acquiring unit 44 generates providing information, in which a plurality of output images are arranged in order from the largest coefficient of the corresponding change target vector.

Figure 4:
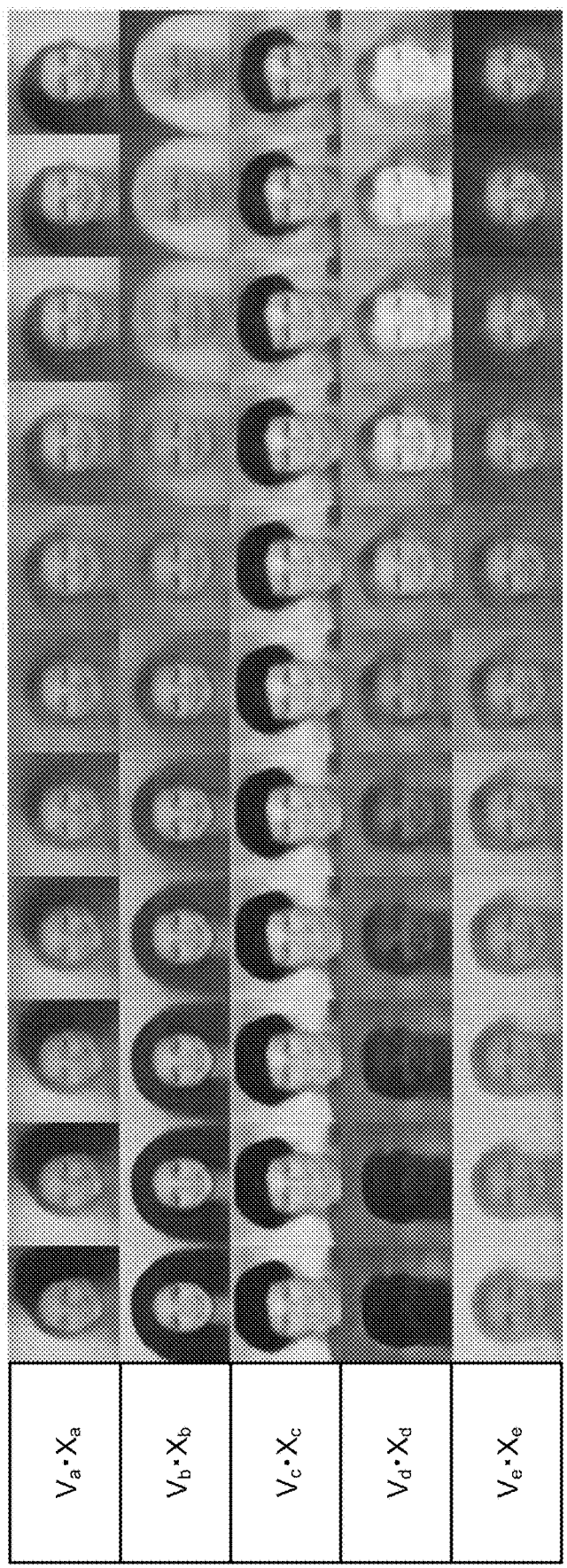
FIG. 4 is a diagram illustrating an example of providing information generated by an information processing apparatus according to the embodiment.

For example, FIG. 4 is a diagram illustrating an example of the providing information generated by the information processing apparatus according to the embodiment. In the example illustrated in FIG. 4, an example of a plurality of pieces of providing information that are generated from each of the input images by gradually changing an element of the coded vector is illustrated.

For example, the information providing apparatus 10 generates a plurality of abstract vectors by gradually changing an element corresponding to the column vector $V_a$ in the abstract vector of the image $X_a$, and generates output images using the generated abstract vectors. Similarly, the information providing apparatus 10 generates a plurality of abstract vectors by gradually changing elements corresponding to the column vectors $V_b$ to $V_e$ in the abstract vectors of the image $X_b$ to the image $X_e$, and generates providing information using the generated abstract vectors.

Then, if the column vectors $V_a$ to $V_e$ have coefficients such that the value of the coefficients is reduced in this order, the information providing apparatus 10 generates providing information in which a plurality of images that are generated in order from the image $X_a$ to the image $X_e$ are arranged. By referring to the providing image as described above, a user is able to easily recognize a type of the component of the feature learned by the model M.

For example, the user is able to identify that the model M has learned the "face orientation" as the column vector $V_a$, by referring to the plurality of images corresponding to the image $X_a$. Further, the user is able to identify that the model M has learned the "color of hair" as the column vector $V_b$, by referring to a plurality of images corresponding to the image $X_b$. Furthermore, the user is able to identify that the model M has learned the "gender" as the column vector $V_c$, by referring to a plurality of images corresponding to the image $X_c$. Moreover, the user is able to identify that the model M has learned "strength of lighting" as the column vector $V_d$, by referring to a plurality of images corresponding to the image $X_d$. Furthermore, the user is able to identify that the model M has learned a "background color" as the column vector $V_e$, by referring to a plurality of images corresponding to the image $X_e$.

In other words, the information providing apparatus 10 performs a process of causing the model M to output a plurality of pieces of output information corresponding to predetermined input information while gradually changing encoded input information upon input of the predetermined input information.

Referring back to FIG. 2, the explanation will be continued. The providing unit 45 provides a plurality of pieces of acquired output information. For example, the providing unit 45 transmits the providing information generated by the acquiring unit 44 to the information processing apparatus 100.

3. Flow of Process Performed by Information Providing Apparatus

Figure 5:
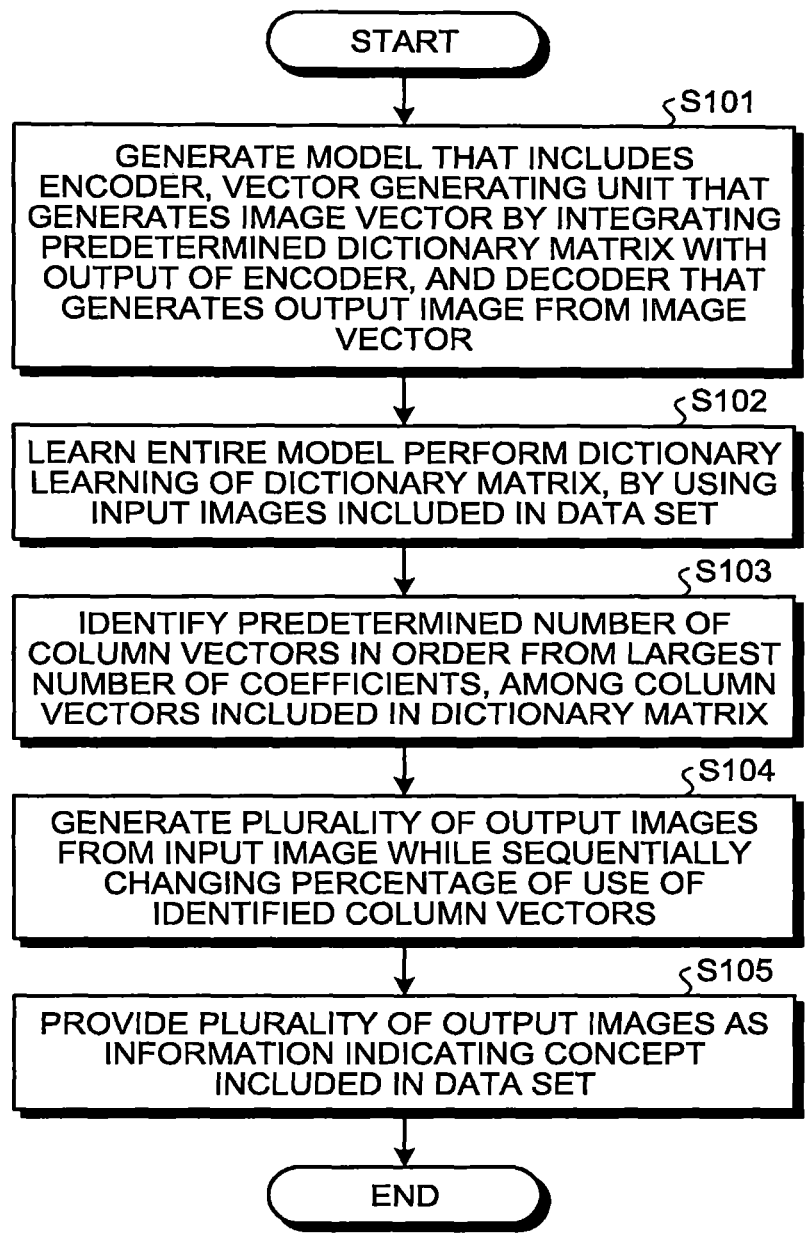
FIG. 5 is a flowchart illustrating an example of a process performed by the information providing apparatus according to the embodiment.

Next, with reference to FIG. 5, an example of the flow of the learning process and the providing process performed by the information providing apparatus 10 will be described. FIG. 5 is a flowchart illustrating an example of the flow of a process performed by the information providing apparatus according to the embodiment.

First, the information providing apparatus 10 generates the model M that includes the encoder EN, the vector generating unit VCU that generates an image vector by integrating a predetermined dictionary matrix with output of the encoder EN, and the decoder DE that generates an output image from the image vector (Step S101). Then, the information providing apparatus 10 learns the entire model M and performs dictionary learning of the dictionary matrix, by using input images included in the data set (Step S102).

Subsequently, the information providing apparatus 10 identifies a predetermined number of column vectors in order from the largest value of coefficients, among the column vectors included in the dictionary matrix (Step S103). Then, the information providing apparatus 10 generates a plurality of output images from the input image while sequentially changing a percentage of use of the identified column vectors (Step S104). Thereafter, the information providing apparatus 10 provides the plurality of output images as information indicating a concept included in the data set (Step S105), and terminates the process.

4. Modification

One example of the learning process and the providing process performed by the information providing apparatus 10 has been described above. However, the embodiments are not limited to this example. Variations of the learning process and the providing process performed by the information providing apparatus 10 will be described below.

4-1. Configuration of Apparatus

The information providing apparatus 10 may be communicably connected to an arbitrary number of the information processing apparatuses 100. Further, the information providing apparatus 10 may be implemented by a front-end server that exchanges information with the information processing apparatus 100, and a back-end server that performs various processes. In this case, the front-end server includes the receiving unit 41 and the providing unit 45 illustrated in FIG. 2, and the back-end server includes the generating unit 42, the learning unit 43, and the acquiring unit 44 illustrated in FIG. 2. Furthermore, the learning data database 31 and the model database 32 registered in the storage unit 30 may be managed by an external storage server.

4-2. Others

Of the processes described in the embodiments, all or part of a process described as being performed automatically may also be performed manually. Alternatively, all or part of a process described as being performed manually may also be performed automatically by known methods. In addition, the processing procedures, specific names, and information including various kinds of data and parameters illustrated in the above-described document and drawings may be arbitrarily changed unless otherwise specified. For example, various kinds of information illustrated in the drawings are not limited to those illustrated in the drawings.

In addition, the components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

Furthermore, the embodiments described above may be arbitrarily combined as long as the processes do not conflict with each other.

5. Program

Figure 6:
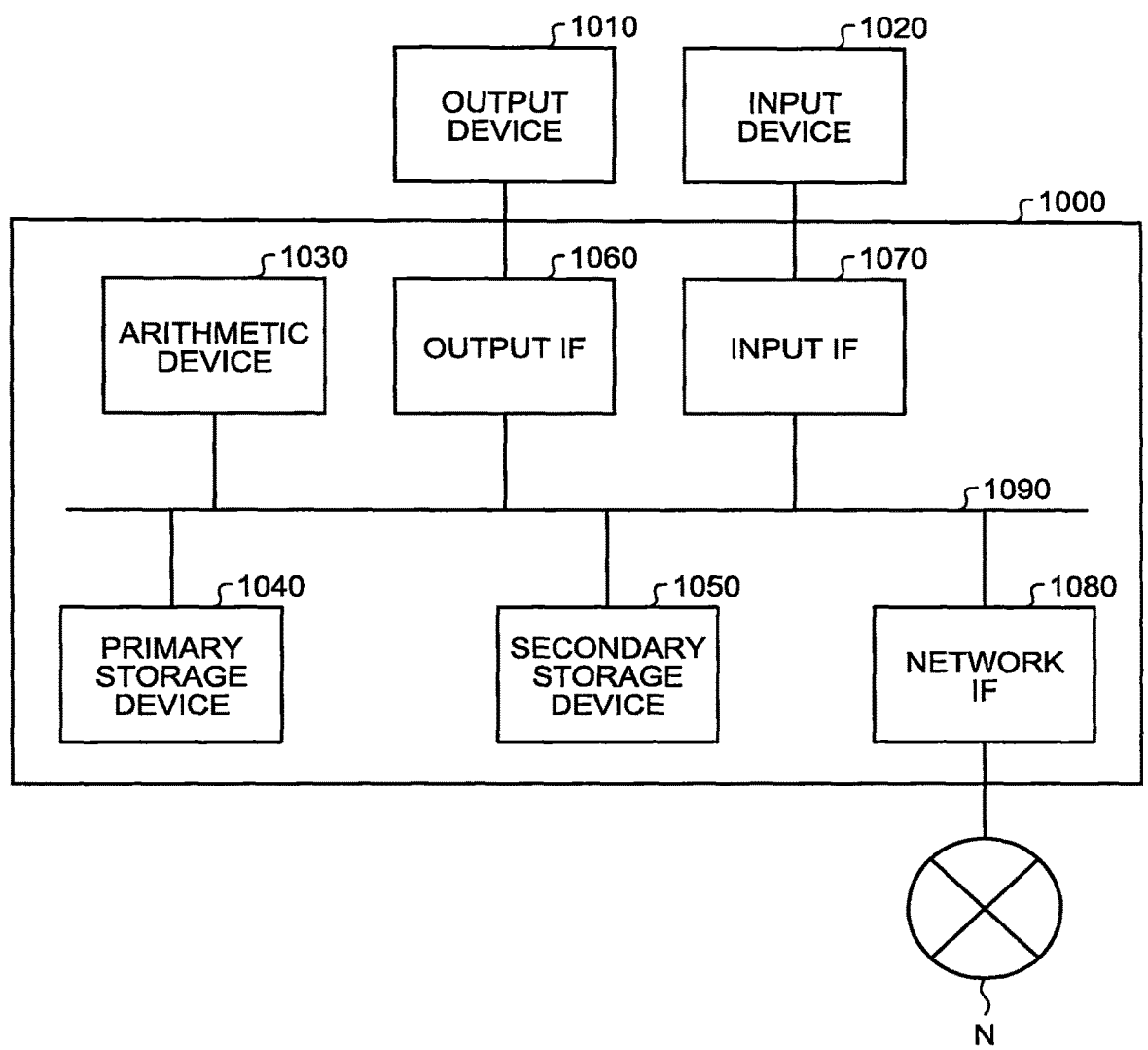
FIG. 6 is a diagram illustrating an example of a hardware configuration.

The information providing apparatus 10 according to the embodiment described above is implemented by, for example, a computer 1000 having a configuration as illustrated in FIG. 6. FIG. 6 is a diagram illustrating an example of a hardware configuration. The computer 1000 is connected to an output device 1010 and an input device 1020, and includes an arithmetic device 1030, a primary storage device 1040, a secondary storage device 1050, an output interface (IF) 1060, an input IF 1070, and a network IF 1080, all of which are connected to one another via a bus 1090.

The arithmetic device 1030 operates based on a program stored in the primary storage device 1040 or the secondary storage device 1050 or a program read from the input device 1020, and executes various processes. The primary storage device 1040 is a memory device, such as a RAM, that primarily stores therein data to be used by the arithmetic device 1030 for various calculations. The secondary storage device 1050 is a storage device for registering various databases and data to be used by the arithmetic device 1030 for various calculations, and is implemented by a read only memory (ROM), a hard disk drive (HDD), a flash memory, or the like.

The output IF 1060 is an interface for transmitting information, which is to be an output target, to the output device 1010, such as a monitor or a printer, that outputs various kinds of information, and is implemented by, for example, a connector of a certain standard, such as a universal serial bus (USB), a digital visual interface (DVI), or a high definition multimedia interface (HDMI) (registered trademark). The input IF 1070 is an interface for receiving information from any kind of the input device 1020, such as a mouse, a keyboard, and a scanner, and is implemented by, for example, a USB or the like.

The input device 1020 may be a device that reads information from, for example, an optical recording medium, such as a compact disc (CD), a digital versatile disk (DVD), or a phase change rewritable disk (PD), a magneto optical recording medium, such as a magneto-optical disk (MO), a tape medium, a magnetic recording medium, a semiconductor memory, or the like. Further, the input device 1020 may be an external recording medium, such as a USB memory.

The network IF 1080 receives data from other devices via the network N, sends the data to the arithmetic device 1030, and transmits data generated by the arithmetic device 1030 to other devices via the network N.

The arithmetic device 1030 controls the output device 1010 and the input device 1020 via the output IF 1060 and the input IF 1070. For example, the arithmetic device 1030 loads a program from the input device 1020 or the secondary storage device 1050 onto the primary storage device 1040, and executes the loaded program.

For example, when the computer 1000 functions as the information providing apparatus 10, the arithmetic device 1030 of the computer 1000 executes programs and data (for example, a processing model M1) loaded on the primary storage device 1040, to thereby implement the functions of the control unit 40. The arithmetic device 1030 of the computer 1000 reads the programs and data (for example, the processing model M1) from the primary storage device 1040 and executes the programs and data. Alternatively, the arithmetic device 1030 may acquire the programs from other devices via the network N.

6. Effect

As described above, the information providing apparatus 10 generates the model M that includes the encoder EN that encodes input information, the vector generating unit VCU that generates a vector by applying a predetermined matrix to encoded information, and the decoder DE that generates information corresponding to the information from the vector. Then, the information providing apparatus 10 learns the model such that when predetermined input information is input to the model M, the model outputs output information corresponding to the input information and the predetermined matrix serves as a dictionary matrix of the input information. As a result of the process as described above, the information providing apparatus 10 is able to obtain a dictionary matrix of a feature included in information that is included in the data set used for the learning, that is, a component of the feature, without using user's arbitrary recognition. Therefore, it is possible to provide information that enables visualization as to what kind of feature has been learned by the DNN, so that it is possible to check the learned feature.

Furthermore, the information providing apparatus 10 learns the model M such that the output information approaches the input information. Moreover, the information providing apparatus 10 learns the model M so as to encode the input information to a sparse vector. Furthermore, the information providing apparatus 10 learns the model M such that vectors included in the predetermined matrix become orthogonal to each other. For example, the information providing apparatus 10 generates the model M including the vector generating unit VCU that integrates a predetermined matrix with encoded information, and learns the model M such that column vectors included in the predetermined matrix become orthogonal to each other. As a result of the process as described above, the information providing apparatus 10 is able to appropriately learn the dictionary matrix, which indicates a type of a component of the feature included in the data set.

Moreover, the information providing apparatus 10 encodes predetermined input information by using the encoder EN for which learning has been performed, and acquires a plurality of pieces of output information corresponding to the predetermined input information by using the vector generating unit VCU and the decoder DE, for which learning has been performed by the learning unit, while changing an encoding result. Then, the information providing apparatus 10 provides the plurality of pieces of acquired output information. As a result of the process as described above, the information providing apparatus 10 is able to provide information with which it is possible to easily understand what kind of component of the feature has been learned.

Furthermore, the information providing apparatus 10 identifies a predetermined number of base vectors in order from the largest coefficient among base vectors included in the dictionary matrix, and acquires a plurality of pieces of output information corresponding to the input information while changing a value of a certain element corresponding to the identified base vectors among the elements included in a coded vector that is obtained by encoding the input information. As a result of the process as described above, the information providing apparatus 10 is able to provide information indicating a more important component among the components of the feature included in the data set, by each piece of information included in the data set.

Moreover, the information providing apparatus 10 generates, as the model M, a model M that includes the encoder EN that encodes an input image, the vector generating unit VCU that generates a vector by applying a predetermined matrix to the encoded image, and the decoder DE that generates an image corresponding to the image from the vector. As a result, the information providing apparatus 10 is able to obtain information indicating how the component of the feature included in the image has been learned.

Furthermore, the information providing apparatus 10 generates, as the model M, a model M including the decoder DE that reproduces, from the vector, information input to the encoder EN. Moreover, the information providing apparatus 10 generates, as the model M, a model M that includes a convolutional neural network as the encoder EN. Therefore, the information providing apparatus 10 is able to provide information indicating what kind of feature has been learned by the model M that includes various structures depending on purposes.

While the embodiments of the present application have been explained in detail above based on the drawings, the embodiments are described by way of example, and the present invention may be embodied in various other forms with various changes or modifications based on knowledge of person skilled in the art, in addition to the embodiments described in this specification.

Furthermore, "a unit" recited in this document may be replaced with "a section, a module, or a means" or "a circuit". For example, the generating unit may be replaced with a generating means or a generating circuit.

According to one aspect of the embodiment, it is possible to check what kind of feature has been learned by a DNN.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A learning apparatus comprising:
    a processor programmed to generate a model that includes:
        an encoder that encodes input information,
        a vector generator that generates a vector by applying a predetermined matrix to the information encoded by the encoder, and
        a decoder that generates information corresponding to the information from the vector; and
    wherein the processor is further programmed such that, when predetermined input information is input to the model, the processor causes the model to learn such that the model outputs output information corresponding to the input information and the predetermined matrix serves as a dictionary matrix of the input information, and
    the processor is further programmed to select a column vector from the dictionary matrix as a component vector, generate the model such that the model outputs a plurality of pieces of the output information, and cause each of the plurality of pieces of the output information to be changed with a different percentage of the component vector.

2. The learning apparatus according to claim 1, wherein the processor is programmed to cause the model to learn such that the output information approaches the input information.

3. The learning apparatus according to claim 1, wherein the processor is programmed to cause the model to learn so as to encode the input information to a sparse vector.

4. The learning apparatus according to claim 1, wherein the processor is programmed to cause the model to learn such that vectors included in the predetermined matrix become orthogonal to one another.

5. The learning apparatus according to claim 4, wherein the processor is programmed to generate the model including the vector generator that integrates the predetermined matrix with the encoded information, and
    the processor is programmed to cause the model to learn such that column vectors included in the predetermined matrix become orthogonal to each other.

6. The learning apparatus according to claim 1,
    wherein the processor is programmed to encode predetermined input information by using the encoder, the encoder being learned by the processor, and acquire the plurality of pieces of output information corresponding to the predetermined input information by using the vector generator and the decoder, the decoder being learned by the processor, while changing an encoding result; and
    the processor is programmed to provide the plurality of pieces of output information acquired by the processor to an external device.

7. The learning apparatus according to claim 6, wherein the processor is programmed to identify a predetermined number of base vectors in order from a largest coefficient among base vectors included in the dictionary matrix, and change a value of a certain element corresponding to the identified base vectors among elements included in a coded vector that is obtained by encoding the input information.

8. The learning apparatus according to claim 1, wherein:
    the encoder encodes an input image,
    that the vector generator generates the vector by applying a predetermined matrix to the encoded image, and
    the decoder generates an image corresponding to the image from the vector.

9. The learning apparatus according to claim 1, wherein the decoder reproduces, from the vector, information input to the encoder.

10. The learning apparatus according to claim 1, wherein the processor generates, as the model, a model that includes a convolutional neural network as the encoder.

11. A learning method implemented by a learning apparatus, the learning method comprising:
    generating a model that includes:
        an encoder that encodes input information,
        a vector generator that generates a vector by applying a predetermined matrix to the information encoded by the encoder, and
        a decoder that generates information corresponding to the information from the vector; and
    learning, when predetermined input information is input to the model, the model such that the model outputs output information corresponding to the input information and the predetermined matrix serves as a dictionary matrix of the input information, and
    selecting a column vector from the dictionary matrix as a component vector, generating the model such that the model outputs a plurality of pieces of the output information, and causing each of the plurality of pieces of the output information to be changed with a different percentage of the component vector.

12. A non-transitory computer-readable storage medium having stored therein a learning program that causes a computer to execute:
    generating a model that includes:
        an encoder that encodes input information,
        a vector generator that generates a vector by applying a predetermined matrix to the information encoded by the encoder, and
        a decoder that generates information corresponding to the information from the vector; and
    learning, when predetermined input information is input to the model, the model such that the model outputs output information corresponding to the input information and the predetermined matrix serves as a dictionary matrix of the input information, and
    selecting a column vector from the dictionary matrix as a component vector, generating the model such that the model outputs a plurality of pieces of the output information, and causing each of the plurality of pieces of the output information to be changed with a different percentage of the component vector.

13. A non-transitory computer-readable storage medium having stored therein a program that causes a computer to perform as a model comprising:
    an encoder that encodes input information;
    a vector generator that generates a vector by applying a predetermined matrix to the information encoded by the encoder; and
    a decoder that generates information corresponding to the information from the vector, wherein
    the model being learned such that when predetermined input information is input, the model outputs output information corresponding to the input information and the predetermined matrix serves as a dictionary matrix of the input information, and the computer selects a column vector from the dictionary matrix as a component vector, causes the model to output a plurality of pieces of the output information, and causes each of the plurality of pieces of the output information to be changed with a different percentage of the component vector.

\* \* \* \* \*